Jan. 27, 1959 — J. W. KIMBALL — 2,870,562
CARTRIDGE CASE EXTRACTOR FOR A FIREARM
Filed Feb. 8, 1956 — 2 Sheets-Sheet 1
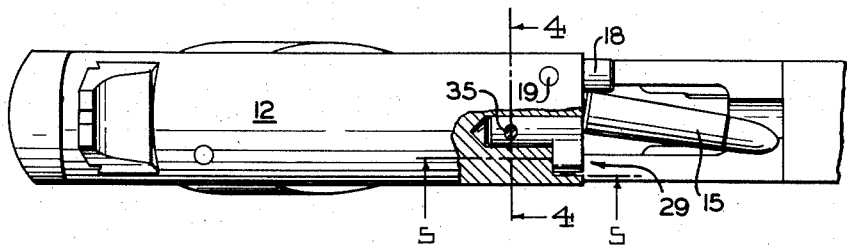
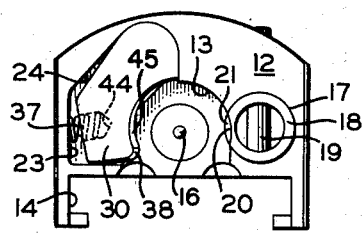 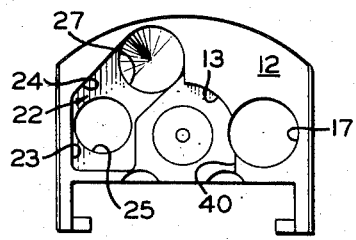
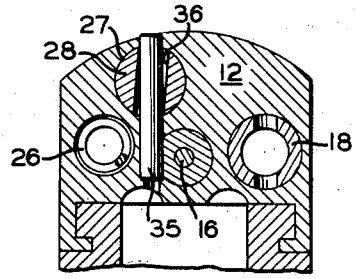 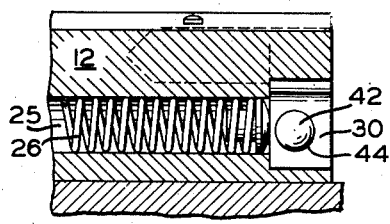
INVENTOR.
John W. Kimball
BY
W. E. Thibodeau and A. W. Dew
ATTORNEYS.

Jan. 27, 1959    J. W. KIMBALL    2,870,562
CARTRIDGE CASE EXTRACTOR FOR A FIREARM
Filed Feb. 8, 1956    2 Sheets-Sheet 2
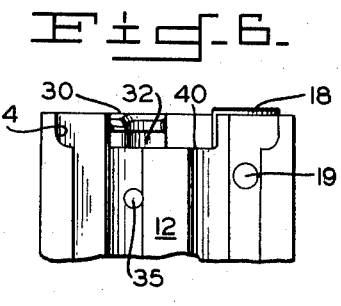
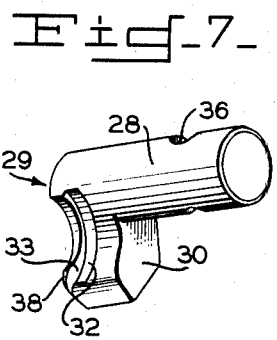
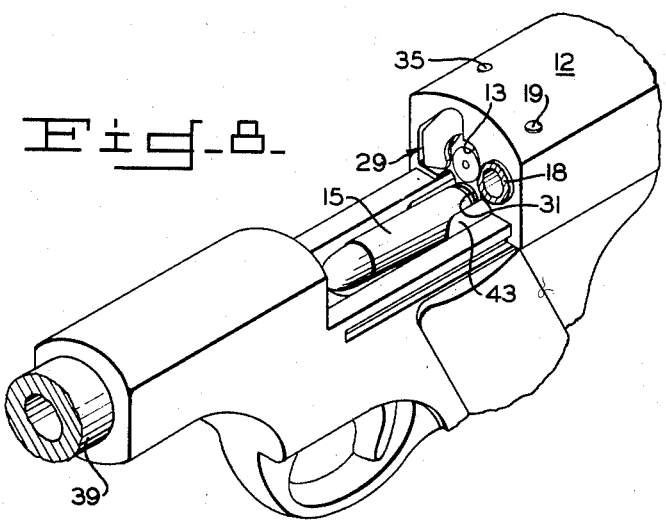
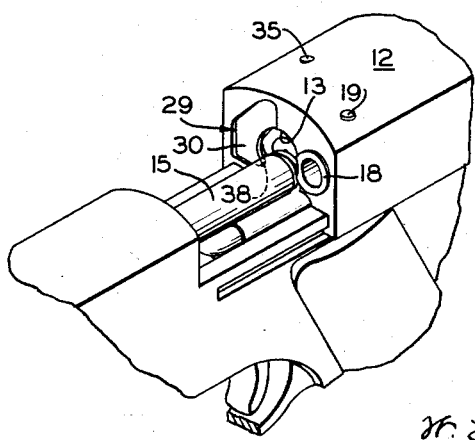
INVENTOR.
John W. Kimball

United States Patent Office 2,870,562
Patented Jan. 27, 1959

2,870,562

CARTRIDGE CASE EXTRACTOR FOR A FIREARM

John W. Kimball, Detroit, Mich.

Application February 8, 1956, Serial No. 564,331

3 Claims. (Cl. 42—25)

(Granted under Title 35, U. S. Code (1952), sec. 266)

The invention described herein may be manufactured and used by or for the Government for governmental purposes without the payment of any royalty thereon.

This invention relates to cartridge case extractors for firearms and is more particularly directed to an improved arrangement for mounting a cartridge extractor in the forward end of a reciprocating breech member.

In most firearms having a longitudinally reciprocating breechblock, the front face thereof is generally provided with a cylindrical recess adapted to surround the base of the cartridge at the instant of firing. The extractor is, consequently, mounted in the forward end of the breechblock so that the claw or gripping portion thereon normally projects inwardly beyond the exterior periphery of the cartridge seating recess to engage with the front edge of the cartridge case rim during the withdrawal of the fired case from the barrel chamber. Thus, in the normal position of the extractor, the claw portion thereof will obviously interfere with the proper seating of each cartridge case against the front frame of the breechblock. The extractor is, therefore, customarily provided with a cam surface on the inner edge of the claw portion arranged to strike the base of the chambered cartridge as the counterrecoiling breechblock moves into battery position. The resulting impact between the cam surface on the extractor and the base of the chambered cartridge forces the claw portion out of the path of the counterrecoiling breechblock. Since the outward pivotal movement of the extractor is opposed by suitable spring means, the claw portion is returned to the normal unpivoted position thereof upon clearing the base of the chambered cartridge and, consequently, engages in the annular groove or cannelure thereof to assure the subsequent extraction of the fired case from the firing chamber in the barrel.

While the mechanical operation of this type of extractor is highly reliable, it has been found that the fatigue life thereof is relatively unsatisfactory due to the repeated violent impacts between the claw portion and the base of the chambered cartridge. Furthermore, since the breechblock reaches battery position very shortly after the extractor contacts the base of the chambered cartridge, it has been found necessary to form the cam surface on the claw portion with a relatively steep slope in order to pivot the extractor with sufficient rapidity to prevent any appreciable delay in the counterrecoil movement of the breechblock. The resulting sudden and violent pivotal movement imparted to the extractor by such a steep cam surface necessitates a relatively powerful spring to prevent battering between the extractor and the walls of the extractor recess in the breechblock. Accordingly, the sudden snapping movement imparted to the extractor by the spring as the claw portion clears the rim of the chambered cartridge is another contributory factor responsible for the relatively short fatigue life thereof.

It is, therefore, an object of this invention to provide improved means for mounting a cartridge extractor in the forward end of a reciprocal breechblock so that the violent and sudden shocks normally imparted thereto during the engagement of the claw portion with the rim of the cartridge case are appreciably reduced.

Another object of the present invention is to mount an extractor in the forward end of a reciprocal breechblock in such manner that the cartridges will be engaged by the claw portion with a minimum snapping action of the extractor.

A further object of this invention is to provide an improved means for pivotally mounting an extractor in the forward end of a reciprocal breechblock so that the pivotal movement of the claw portion thereon occurs in a plane substantially normal to the longitudinal axis of the breechblock.

It is still another object of this invention to provide an improved pin means for mounting an extractor of the type wherein the pivotal movement thereof is in a plane normal to the longitudinal axis of the breechblock.

A still further object of this invention is to mount an extractor of the aforesaid type with such rigidity against longitudinal movement that the extractor can serve as the front stop for the driving spring employed to return the breechblock to battery position.

A specific object of the present invention is to provide a superior mounting arrangement for an extractor which is particularly adapted to the operation of a semiautomatic pistol and which is characterized by ease of assembly and disassembly and by a superior fatigue life.

The specific nature of the invention as well as other objects and advantages thereof will clearly appear from a description of a preferred embodiment as shown in the accompanying drawings in which:

Fig. 1 is a top view of a slide for a semiautomatic piston with a portion partially cut away to show the extractor of the present invention mounted in the forward end thereof and in engagement with a fire cartridge case during the act of ejection;

Fig. 2 is an enlarged front end view of the slide with the extractor and ejector therein;

Fig. 3 is a view similar to Fig. 2 but with the extractor and ejector removed;

Fig. 4 is a cross-sectional view taken along line 4—4 in Fig. 1 but on an enlarged scale;

Fig. 5 is a cross-sectional view taken along line 5—5 in Fig. 1 but on an enlarged scale and showing how the extractor serves as a front stop for the driving spring of the firearm;

Fig. 6 is an enlarged bottom view of the front end portion of the slide;

Fig. 7 is an enlarged perspective view of the extractor;

Fig. 8 is a fragmentary perspective view of the pistol showing the slide in position to initiate the chambering movement of the uppermost cartridge in the magazine; and Fig. 9 is another fragmentary perspective view of the pistol has begun to move upwardly into the cartridge seating recess in the front face of the slide.

Although the invention is hereafter described in connection with an automatic pistol of the type described in my previous patent application for "Floating Barrel Action for Semiautomatic Firearms," Serial No. 475,321, dated December 14, 1954, now Patent No. 2,846,926, it should be understood that the structure and principles are equally applicable to any type of firearm which employs a longitudinally reciprocal breechblock.

As shown in the drawings, the aforesaid pistol is provided with the typical breechblock or slide 12 in which a cylindrical cartridge seating recess 13 is formed into the front face thereof. However, while the cartridge seating recesses of the prior art are generally fully cylindrical, the present invention utilizes a recess 13 wherein the lower portion thereof is intersected by a rectangular recess 14 extending longitudinally along the underside of slide 12 to form an opening 40 of sufficient width to permit the rear end of a rimmed cartridge case 15 to pass upwardly therethrough into seating engagement with the front face of slide 12 as will be later explained in greater detail. A firing pin 16 is slidably disposed in slide 12 so that the tip thereof will project through the axial center of recess 13 to discharge a cartridge in the manner well known in the art.

The right-hand side of cartridge seating recess 13 as viewed in Figs. 2 and 3 is partially intersected by a longitudinal axial hole 17 in which an ejector 18 is adapted to be slidably disposed and retained for limited reciprocal movement by a vertical pin 19 extending downwardly therethrough from the top of slide 12. The left side of ejector 18 is concavely grooved, as best shown at 20, to continue the circular periphery of recess 13 and such groove extends rearwardly along ejector 18 to form a transverse shoulder 21 for a purpose to be later shown.

The left-hand side of cartridge seating recess 13 is intersected by an extractor recess 22 which extends deeper into the face of slide 12 than recess 13 and is formed by a substantially rectangular vertical section 23 and a similar section 24 extending upwardly therefrom at an obtuse angle to terminate slightly below the top of slide 12. A longitudinal hole 25 intersects vertical section 23 and continues rearwardly therefrom to provide a seat for a conventional driving spring 26 which is compressed during the recoil movement of slide 12 to impart counter-recoil movement thereto. Angular section 24 of extractor recess 22 is intersected by a longitudinal hole 27 adapted to rotatably receive a pinlike shank portion 28 on the extractor 29 of the present invention.

Extractor 29 is provided with an arcuate claw portion 30 projecting transversely from shank portion 28 and having an exterior configuration similar to that of extractor recess 22 in slide 12. However, the width of claw portion 30 is somewhat smaller than that of recess 22 so that extractor 29 is mounted for limited rotation about the longitudinal axis of shank portion 28. The length of shank portion 28 and the depth of cartridge seating recess 13 permits the front end of extractor 29 to lie substantially flush with the front end of slide 12. The inner periphery of claw portion 30 is arcuately formed to substantially the same contour as the rim 31 on cartridge 15 and is arranged to continue the circular periphery of recess 13 when the vertical side of extractor 29 is substantially parallel to the wall of the vertical portion 23 of extractor recess 22. The inner periphery of claw portion 30 is also provided with a channel 32 to form a shoulder 33 against which cartridge case rim 31 is firmly held during the extraction of cartridge 15 from the firing chamber of the barrel 39. The radius of channel 32 is such that the height of shoulder 33 is increased at both the lower and upper ends of channel 32 as best shown in Fig. 7. However, channel 32 is eccentrically formed relative to the arcuate contour of claw portion 30 whereby the increase in the depth of shoulder 33 at the lower end of channel 32 is slightly greater than at the upper end thereof and may be even further accentuated by a suitable notch (not shown) in order to facilitate the entry of cartridge case rim 31 into channel 32. In addition, the lower inner core of claw portion 30 is rounded, as shown at 38, to provide a camming surface for a purpose to be explained.

Extractor 29 is rigidly secured in slide 12 against any longitudinal movement by a cylindrical pin 35 which extends downwardly from the top of slide 12 through a vertical hole 36 in the shank portion 28. Hole 36, however, is of oval construction so that while extractor 29 may be secured against longitudinal movement, it is still free to rotate in a plane substantially normal to the longitudinal axis of slide 12. As best shown in Fig. 2, a spring 37 serves to normally bias extractor 29 to partially block opening 40 in the bottom of cartridge seating recess 13 and is seated in a suitable transverse hole 44 formed into the side of the lower end of claw portion 30. A flanged stud 42 is contained in the outer end of spring 37 in contact with the vertical wall portion of extractor recess 22.

Accordingly, when the uppermost cartridge 15 in the magazine clears retaining lips 43 thereon during the forward movement imparted thereto by the contact with the lower portion of the front face of slide 12, the upward bias of the magazine spring (not shown) will force the base of such cartridge up through vertical opening 40 to bring rim 31 thereon into channel 32 whereby the peripheral surface in the extractor groove of the cartridge will contact the rounded corner 38 on extractor claw portion 30. The continued upward movement of cartridge 15 will, consequently, pivot extractor 29 outwardly about shank portion 28 and against the bias of spring 37. However, the displacement of extractor 29 is extremely slight inasmuch as it is terminated as soon as the central periphery of the cartridge extractor groove has moved beyond rounded corner 38 on claw portion 39 as best shown in Fig. 9. Extractor spring 37 is then free to return claw portion 30 to the unpivoted position thereof and thereby bring the shoulder 33 thereon into the extractor groove of cartridge 15 in position to grip the rim 31 thereof during extraction from barrel 39.

In the event the rim 31 of cartridge 15 moves upwardly in front of claw portion 30 instead of into engagement with channel 32, a beveled surface 45 is provided along the arcuate inner periphery of claw portion 30 in position to strike the base of the chambered cartridge 15 during the conclusion of the forward movement of slide 12 into battery position. As a result of such impact, claw portion 30 is cammed outwardly from between the face of slide 12 and the base of cartridge 15 to permit contact therebetween upon the termination of counterrecoil movement. In this position, channel 32 of claw portion 30 will be in transverse alignment with rim 31 of cartridge 15 to effect the required engagement therebetween when spring 37 returns claw portion 30 to its unbiased position.

It is, therefore, apparent that the extremely slight displacement of extractor 29 eliminates the strong jarring impacts normally encountered during the cartridge case engaging movements of those extractors wherein the claw portion 30 first strikes the base of the cartridge 15 during movement of the slide 12 into battery position. The consequent sharp reduction in the stresses and strains imparted to the extractor will, of course, produce a corresponding increase in the fatigue life thereof as well as of the spring means employed to return the extractor to the unpivoted position thereof. Moreover, the slight displacement of the extractor during the upward movement of the cartridge into seating engagement in recess 13 ensures a minimum amount of interference with the counterrecoil movement of slide 12.

In addition, the fact that extractor 29 is mounted for pivotal or swinging movement only in a plane substantially normal to the longitudinal axis of slide 12 permits such extractor to serve as the front stop for the driving spring 26 which imparts counterrecoil movement to slide 12.

Although a particular embodiment of the invention has been described in detail herein, it is evident that many variations may be devised within the spirit and scope thereof and the following claims are intended to include such variations.

I claim:

1. In combination with a longitudinally reciprocal slide having a substantially arcuate recess extending upwardly into the front face thereof for seating the rim portion of a cartridge case therein and having a substantially rectangular recess extending rearwardly along the underside thereof to intersect the lower portion of said cartridge seating recess and form an entrance for the upward passage of the rim portion of the cartridge case, a cartridge case extractor having a longitudinal shank portion rotatably mounted in said slide above and to the side of said cartridge seating recess therein along an axis substantially parallel to the longitudinal axis of said slide, a claw portion projecting downwardly from the forward end of said shank portion to terminate adjacent the entrance in the lower portion of the cartridge case seating recess for gripping the rim of the case during the upward movement thereof, spring means normally biasing said claw portion to swing about said shank portion as a fulcrum into said cartridge seating recess immediately above said cartridge case rim entrance therein, a cylindrical pin extending downwardly from the top of said slide through said shank portion to positively secure said extractor against longitudinal movement while simultaneously limiting the swinging movement of said claw portion into and out of said cartridge seating recess, and a cam surface disposed at the lower inner corner of said clow portion to permit the upwardly and outward displacement thereof out of the upward path of the cartridge case during the passage of the case through said entrance in said cartridge seating recess.

2. In combination with a longitudinally reciprocal slide having a substantially arcuate recess extending upwardly into the front face thereof to seat the rear end of a cartridge case in which an annular extractor groove forms a rim, said slide having a substantially rectangular recess extending longitudinally along the underside thereof to intersect the lower portion of said cartridge seating recess and form an entrance for the upward passage of the rear end of the cartridge case, and a longitudinal spring in said slide for imparting counterrecoil movement thereto, a cartridge case extractor having a longitudinal shank portion mounted in said slide for rotation about its own longitudinal axis, a claw portion projecting outwardly from the forward end of said shank portion to lie in abutment with the forward end of said driving spring and transmit the bias thereof to said slide, an extractor spring normally biasing said claw portion to swing inwardly of said cartridge seating recess above said cartridge case entrance therein, said claw portion having an arcuate inner edge and an arcuate channel therealong for receiving the rim of a cartridge case, said channel being eccentric relative to said inner edge to form a shoulder for gripping the rim of the cartridge case during the extracting movement thereof, said shank portion having an oval hole extending vertically therethrough with the longer axis thereof substantially at right angles to the longitudinal axis of said slide, a cylindrical pin having a diameter substantially equivalent to the shorter axis of said oval hole and extending downwardly from the top of said slide through said oval hole to secure said extractor against longitudinal movement while still permitting limited rotation of said shank portion about the longitudinal axis thereof whereby said claw portion is free to swing into and out of said cartridge seating recess, and a cam surface disposed at the lower corner of said arcuate inner edge of said claw portion for contact by the exterior periphery of the cartridge case extraction groove whereby the upward movement of the rear end of the cartridge case through said entrance in said cartridge seating recess cams said claw portion out of the way with a minimum of displacement thereof.

3. The combination defined in claim 2 wherein said claw portion is provided with a beveled surface along the front face thereof to strike the base of the cartridge case during the counterrecoil movement of said slide in the event of a failure of the rim thereon to enter into said arcuate channel whereby said slaw portion is cammed outwardly from between the front face of said arcuate recess in said slide and the base of the cartridge case to permit said arcuate channel to advance into alignment with the rim of the cartridge case.

References Cited in the file of this patent
UNITED STATES PATENTS

| | | |
|---|---|---|
| 400,712 | Rider | Apr. 2, 1889 |
| 2,198,610 | Garand | Apr. 30, 1940 |

FOREIGN PATENTS

| | | |
|---|---|---|
| 573,096 | Germany | Mar. 27, 1933 |
| 242,372 | Switzerland | Oct. 1, 1946 |